United States Patent [19]
VerWest

[11] Patent Number: 5,862,100
[45] Date of Patent: Jan. 19, 1999

[54] METHOD AND SYSTEM FOR DETECTING HYDROCARBON RESERVOIRS USING STATISTICAL NORMALIZATION OF AMPLITUDE-VERSUS-OFFSET INDICATORS BASED UPON SEISMIC SIGNALS

[75] Inventor: Bruce J. VerWest, Richardson, Tex.

[73] Assignee: Atlantic Richfield Company, Los Angeles, Calif.

[21] Appl. No.: 654,258

[22] Filed: May 28, 1996

[51] Int. Cl.$^6$ .............................. G01V 1/30; G01V 1/28
[52] U.S. Cl. .............................. 367/38; 367/47; 367/68; 364/421
[58] Field of Search .............................. 367/38, 47, 59, 367/68, 70; 364/421

[56] References Cited

U.S. PATENT DOCUMENTS

| | | | |
|---|---|---|---|
| 4,995,007 | 2/1991 | Corcoran et al. | 367/52 |
| 5,001,677 | 3/1991 | Masters | 367/68 |
| 5,257,242 | 10/1993 | Clawson | 367/38 |
| 5,258,960 | 11/1993 | Swan | 367/38 |
| 5,515,335 | 5/1996 | Swan | 367/47 |

OTHER PUBLICATIONS

Swan, "Properties of direct AVO hydrocarbon indicators", *Offset–dependent reflectivity —Theory and Practice of AVO Analysis* (Castagna, J.P. & Backus, M.M., eds., Soc. Expl. Geophys., 1993), pp. 78–92.

Taner, et al., "Complex Seismic Trace Analysis", *Geophysics*, vol. 44, No. 6 (Jun., 1979), pp. 1041–1063.

Abramowitz and Stegun, ed., *Handbook of Mathematical Functions* (Dover Publications, 1965), pp. 936, 940.

Castagna et al., "Comparison of AVO indicators: A modeling study", Geophysics, vol. 59, No. 12, Dec. 1994.

*Primary Examiner*—Ian J. Lobo
*Attorney, Agent, or Firm*—Anderson, Levine & Lintel

[57] ABSTRACT

A method and system for producing an indicator for amplitude-versus-offset (AVO) analysis of seismic survey data is disclosed. According to the disclosed method and system, a raw AVO indicator is generated for each of multiple depth points, from the AVO intercept and gradient coefficient values. The indicator is generally a positive amplitude number for those locations having petrophysical importance, while the background neighboring points will have a zero or negative value for the raw indicator. Statistics are derived for a group of depth points that surround the depth point under analysis, in time and in space, from which a probability function may be evaluated, assuming a distribution of values in the background trend of AVO intercept and gradient values, and based upon which the raw AVO indicator will be modified. In one embodiment, the probability function is evaluated to determine the loci of points that are within the background to a certain statistical confidence. The modified AVO indicator is set to zero for points within the loci, so that a depth point having a positive raw AVO indicator but within the statistical spread of points in the survey will not be falsely identified as petrophysically important. According to a second embodiment, the probability function for the depth point under analysis is evaluated, and the result combined with the raw AVO indicator to produce the modified indicator; points within the statistical spread of the background have greatly devalued modified AVO indicators according to this embodiment.

19 Claims, 10 Drawing Sheets

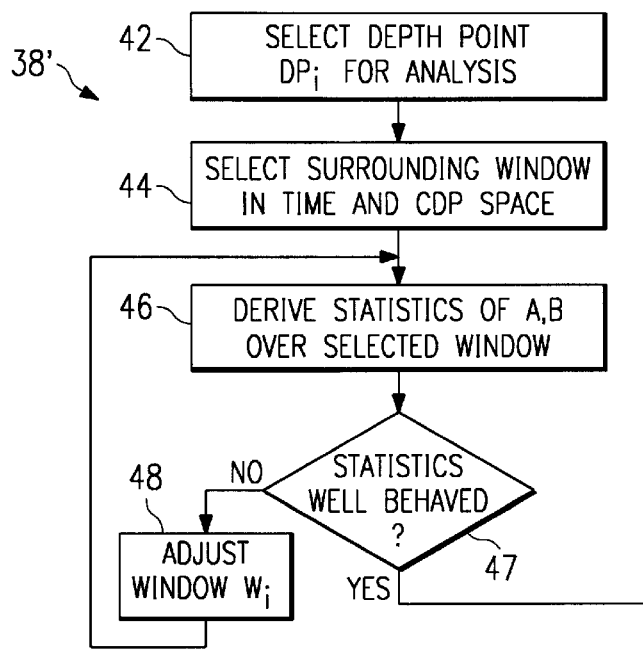
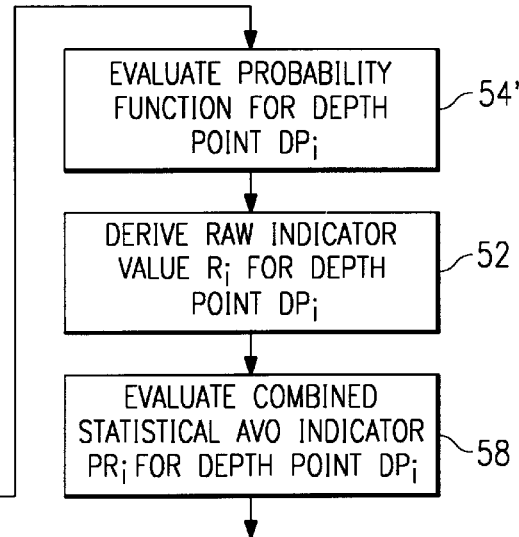
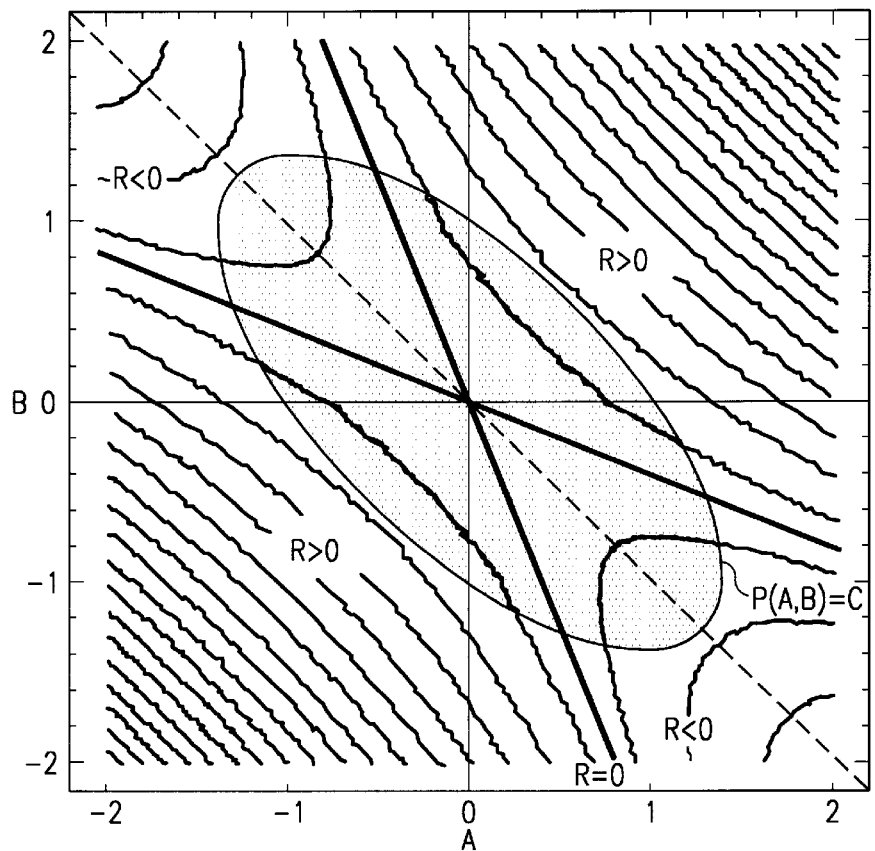

METHOD AND SYSTEM FOR DETECTING HYDROCARBON RESERVOIRS USING STATISTICAL NORMALIZATION OF AMPLITUDE-VERSUS-OFFSET INDICATORS BASED UPON SEISMIC SIGNALS

This invention is in the field of seismic prospecting for oil and gas reservoirs, and is more specifically directed to the analysis of seismic signals indicative of subsurface geological interfaces and structures.

BACKGROUND OF THE INVENTION

The use of seismic surveys is now fundamental in the search for oil and gas reservoirs in the earth. As is rudimentary in the art, seismic surveys are performed by imparting acoustic energy of a known amplitude and frequency pattern at one or more locations of the earth (either at a land surface or in a marine environment), and then detecting reflected and refracted acoustic energy at other locations. The delay time between the imparting of the acoustic energy at the source location and detection of the same wave at a receiver location is indicative of the depth at which a particular reflecting geological interface is located. The field of seismic data analysis is concerned with techniques for analyzing the detected acoustic energy to determine both the location and also the properties of various geological strata.

A known technique in the generation and analysis of conventional seismic surveys is referred to as amplitude-versus-offset ("AVO") analysis. According to the AVO approach, attributes of a subsurface interface are determined both from the normal-incidence amplitude of reflected seismic energy and also from the dependence of the detected seismic reflections on the angle of incidence of the energy. According to conventional AVO analysis, multiple seismic traces (i.e., time-domain signals at different detection locations) that include a signal from a common reflection point are collected; such a group of traces is commonly referred to as a common-depth point (CDP) gather. Typically, a series of common reflection points for the same source-receiver pairs underlie the same surface location at the midpoint between the source and receiver for multiple offsets; as such, this gather is also often referred to as a common midpoint (CMP) gather.

From the CDP (or CMP) gather, one may derive the amplitude R of a reflected seismic wave from an interface (i.e., the "target horizon") as a function of the angle of incidence θ from the normal according to the following relationship:

$$R(\theta) = A + B \sin^2\theta$$

In this case, the coefficient A is the zero-offset response (also referred to as the AVO intercept), while the coefficient B is referred to as the AVO slope, or gradient, as it is representative of the rate of change of amplitude with the square of the angle of incidence.

For a given reflection event from a horizon between two geological formations, the values of A and B will depend upon the physical properties of the two formations. The well-known Zoeppritz equations provide closed form equations for R(θ) based upon the compressional velocities ($V_p$), shear velocities ($V_s$), and densities (ρ) of the two formations at the reflecting interface. However, inversion of the Zoeppritz equations to solve for the elastic properties of the formations from reflection data is impractical, due to numerical complexity.

By way of further background, the calculation of theoretical values for A and B for isolated rock interfaces (i.e., at specific horizons) through the use of the linearized Zoeppritz equations and based upon typical values for compressional velocity, density and Poisson's ratio for the strata on either side of the interface of interest, is described in Swan, "Properties of direct AVO hydrocarbon indicators", *Offset-dependent reflectivity—Theory and Practice of AVO analysis* (Castagna, J. P. & Backus, M. M., eds., Soc. Expl. Geophys., 1993), pp. 78–92. As described therein, variations in the A and B values for particular interfaces from a theoretical A-versus-B trend line for the expected stratigraphic sequences can indicate the location of interfaces in the survey.

Typically, AVO seismic data analysis involves the derivation of so-called "indicators" from the A and B coefficients for reflection depth points in the survey. In order to convey phase information regarding the reflections, the A and B coefficient values as a function of time are frequently converted into complex, or analytical, traces by applying the Hilbert transform to the measured A and B values. A common AVO indicator is generated from such complex traces as the product of the complex AVO intercept value A with the complex conjugate of the AVO slope B; this indicator function thus has the form f(A,B)=AB*. Typically, the amplitude of the indicator function is plotted as a function of time in similar fashion as raw or stacked seismic traces, with each indicator trace associated with a surface location. Variations in the amplitude of the indicators over time can identify the location of geological interfaces, particularly those which correspond to formations potentially bearing oil and gas in producible quantities.

For example, conventional AVO seismic analysis begins with the acquisition of data for a two-dimensional or three-dimensional survey in the usual manner. Conventional seismic data processing is then performed, including such operations as multiple elimination, filtering, prestack migration (i.e., time-domain to depth transformation) and normal move-out (NMO) correction, followed by grouping the signals into CDP gathers. Conventional AVO analysis then performs a regression of the seismic signals in each gather to derive the A and B coefficient values at each depth point, typically through a least-squares fit of the seismic data versus the squared sine of the angle of incidence. Once the A and B coefficient values are determined for each depth in the survey area, indicators such as the product AB* may be plotted as a survey section over surface location and time (i.e., in CMP-time space), similarly as seismic survey sections of other types.

Certain indicators are known as reliable in identifying the location of potential oil and gas reservoirs. For example, the product AB* is known to indicate the presence of hydrocarbon bearing sands of the so-called "Class 3" type. Class 3 sands are relatively shallow formations, and have an acoustic impedance that is less than the acoustic impedance of a neighboring shale, which results in interfaces therebetween for which the A and B coefficients in AVO analysis are both strongly negative; the product AB* at such interfaces is thus a positive value of detectable amplitude, and is a reliable indicator of the presence of the Class 3 sand.

By way of further background, U.S. Pat. No. 5,661,617, filed Dec. 18,1995, entitled "Method and Apparatus for Detection of Sand Formations in Amplitude-Versus-Offset Seismic Surveys", assigned to Atlantic Richfield Company and incorporated herein by this reference, describes a new AVO indicator for common depth points based upon the value of the AVO intercept A and the deviation of the AVO gradient B from a trend line. The indicator described in this application has been found useful for distinguishing hydrocarbon sands from surrounding formations.

By way of still further background, copending application Ser. No. 08/614,744, pending, filed Mar. 13, 1996, entitled "Method and System for Detecting Hydrocarbon Reservoirs Using Amplitude-versus-Offset Analysis of Seismic Signals", assigned to Atlantic Richfield Company and incorporated herein by this reference, describes a new AVO indicator for common depth points based upon the rate of change of the product of the AVO intercept value and the AVO gradient value for the depth point under analysis, along the direction of a deviation vector of the AVO intercept value and the AVO gradient value from a background trend for depth points surrounding the depth point under analysis in time and space. This new indicator, referred to therein as the $\Delta(AB^*)$ indicator, has proven to be especially valuable in the detection of very deep gas-bearing sands, such sands commonly referred to as Class 1 and Class 2 sands.

Regardless of the particular indicator used in the AVO analysis, potential hydrocarbon reservoirs and interfaces thereof are identified by those locations in the survey for which the indicator value has a significant value. In each of the above cases, as is typical in the art, the AVO indicator is designed to have a large magnitude for depth points that differ, in a petrophysically interesting way, from the background. For example, the simple product indicator AB operates in this fashion, considering that the A and B coefficients are typically negatively correlated with one another at non-hydrocarbon-bearing locations; positive values of the product of the A and B coefficients thus indicate deviations from this negative correlation. Other indicators, including those described hereinabove, operate in a similar fashion to distinguish possible oil or gas bearing locations or interfaces from the background.

In the simple case, one may characterize the background as a best-fit straight line in the A-B plane, and calculate deviations of individual points from the trend line in differentiating hydrocarbon-bearing locations or interfaces from wet or dry formations. As described in the above-incorporated U.S. Pat. No. 5,661,617 and Ser. No. 08/614,744, pending and also in U.S. Pat. No. 5,515,335, filed Aug. 16, 1993, assigned to Atlantic Richfield Company and incorporated herein by this reference, several important statistical characteristics of the values of A and B for each depth point in a portion of a survey may be calculated, such characteristics including the root-mean-square (RMS) of the A and B coefficients, and also the correlation coefficient between A and B over the survey portion of interest. These statistical characteristics provide the analyst with a measurement of the spread of the A and B values in the background trend, from which a statistically adjusted value of the deviation of the AVO indicator for a given depth point from the background trend may be determined.

According to conventional techniques, the criteria used in identifying potential hydrocarbon reservoirs is simply the magnitude of the indicator value. For example, conventional systems display the value of the indicator for each depth point in a survey of common midpoint gathers by way of a color display, where the hue of each point corresponds to the value of the indicator according to a predefined scale. This approach provides the human analyst with a way of readily identifying interesting locations in the survey. This approach has been useful in identifying petrophysically interesting subsurface locations in those cases where the magnitude of the indicator is relatively large. However, heretofore there has been no objective criterion for selection of the indicator threshold, or of the color scale used in the display techniques. As a result, it has been observed in connection with the present invention that conventional AVO indicator analysis techniques are unable, in many cases, to distinguish depth points having a positive AVO indicator but which is not statistically distinct from the background trend (and thus not likely to be interesting to the analyst) from those depth points with positive indicators that are statistically distinct from the background trend. In other words, some depth points in the survey at non-hydrocarbon bearing locations (i.e., within the background trend) may have the same magnitude of AVO indicator as true hydrocarbon-bearing locations, if one considers only the indicator magnitude as the threshold criterion as is conventional in the art.

It is therefore an object of the invention to provide a method and system for analyzing AVO surveys so as to improve the accuracy of the AVO prediction.

It is a further object of the present invention to provide such a method and system that may be used with any one of several AVO indicators.

It is a further object of the present invention to provide such a method and system that may be implemented in an automated fashion.

Other objects and advantages of the present invention will be apparent to those of ordinary skill in the art having reference to the following specification together with its drawings.

SUMMARY OF THE INVENTION

The invention may be incorporated into a computer system and method of operating the same upon seismic survey signals obtained by conventional land or marine survey techniques. According to the present invention, amplitude-versus-offset (AVO) analysis of the reflection events at each depth point is performed upon common depth point (CDP) gathers of the survey, to derive an AVO intercept value A and an AVO gradient value B for each depth point. The A and B coefficient values are retrieved for each depth point in a window of the survey corresponding to several adjacent surface locations over a selected time range; a statistical background trend for the window, and a selected indicator value for each depth point in the window, are derived from these retrieved values. According to the present invention, a selected percentile contour in the background trend is used, in combination with the indicator value, to identify depth points that are both of petrophysical interest and that are also outside of the trend with some statistical certainty; these identified points have a high likelihood of indicating survey points corresponding to hydrocarbon reservoirs.

According to another aspect of the invention, the indicator definition is modified to incorporate the background statistics thereinto, such that a simple threshold value for the indicator may be used to select depth points that are both petrophysically interesting and outside of the trend with a high degree of statistical certainty.

BRIEF DESCRIPTION OF THE DRAWINGS

The file of this patent contains at least one drawing executed in color. Copies of this patent with color drawings will be provided by the Patent and Trademark Office upon request and payment of the necessary fee.

FIG. 9 is a flow chart illustrating the process of deriving a statistical AVO indicator for a depth point in the process of FIG. 3, according to a second preferred embodiment of the present invention.

FIG. 10a is a plot, in the A-B plane, of a raw AVO indicator.

FIG. 11b is a survey plot illustrating values of the statistical probability function for the AVO indicator values of the survey of FIG. 11a.

DETAILED DESCRIPTION OF THE PREFERRED EMBODIMENT

Figure 1:
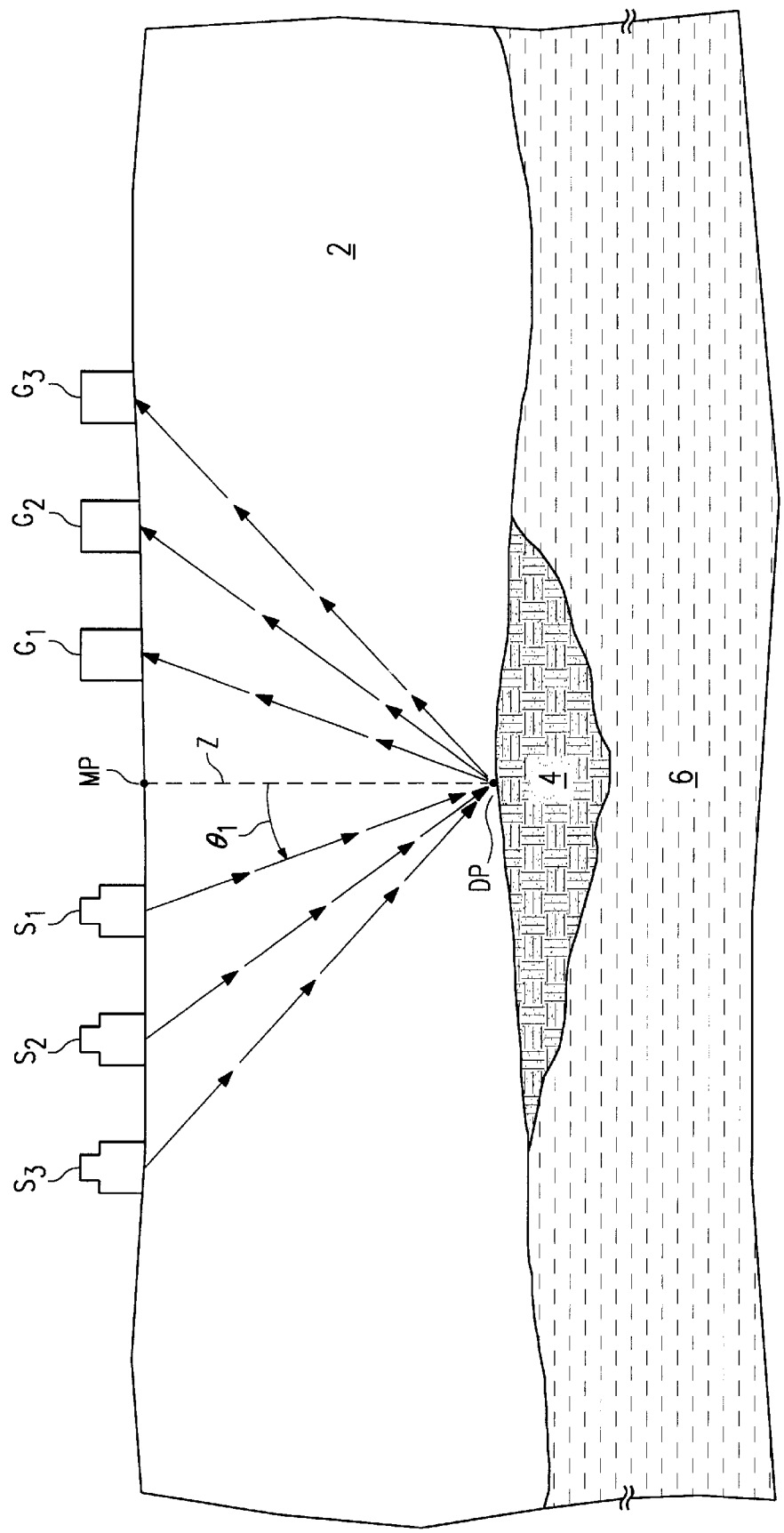
FIG. 1 is a cross-sectional view of a portion of the earth illustrating a single depth point in a seismic survey from which multiple seismic waves are reflected.

Referring first to FIG. 1, a seismic survey with which the preferred embodiment of the invention is useful will first be described for the example of a single depth point DP, in a land-based survey, present at a horizon between formations 2, 4. While the survey of FIG. 1 is a land-based survey, it will of course be appreciated that the present invention is also applicable to marine surveys. Of course, the example of FIG. 1 will provide seismic signals for a multitude of depth points DP from which a seismic survey of either the two-dimensional or three-dimensional (2-D or 3-D) type may be generated. In the example of FIG. 1, depth point DP corresponds to the top surface of sand formation 4.

As is evident from FIG. 1, depth point DP in a seismic survey will reflect seismic energy from multiple source locations and detected by multiple receivers, such that the reflections travel from along multiple paths in the earth at varying angles of incidence. A zero-offset reflection is indicated by path Z between depth point DP and surface location MP that is directly above depth point DP. Seismic energy imparted by source $S_1$ is reflected from depth point DP and detected by geophone $G_1$; the angle of incidence $\theta_1$, is the angle of the path of energy from source $S_1$ from the vertical (i.e., from the zero-offset path). Similarly, energy imparted by sources $S_2$, $S_3$ is reflected from depth point DP and detected by geophones $G_2$, $G_3$, at increasing angles of incidence $\theta$ from the normal. Typically, the amplitude of the imparted seismic energy will vary with variations in the angle of incidence $\theta$. The variation in the amplitude of the energy with the angle of incidence $\theta$ is the basis of amplitude-versus-offset (AVO) seismic analysis techniques.

According to conventional AVO analysis, the relative amplitude of the reflected energy to the imparted energy as detected at the various geophone locations and extrapolated therefrom to zero offset (in effect estimating the reflected energy along vertical path Z from depth point DP to surface location MP) is referred to as the AVO intercept A for depth point DP. The AVO intercept value A may be either positive or negative, and will be between −1 and 1. It is well known that, for typical real geological interfaces and at relatively small angles, the amplitude of reflected to imparted energy varies approximately linearly with the sine squared of the angle $\theta$; the slope of this angular dependence is commonly referred to as the AVO slope B. As such, in conventional AVO analysis, a given depth point DP, which underlies a specific midpoint and is at a specific depth, will have a single A value and a single B value, according to the relationship:

$$R(\theta) = A + B \sin_2 \theta$$

Alternative models used in conventional AVO analysis may be used in connection with the present invention. For example, the reflected energy may be expressed as the following:

$$R(\theta) = A \cos^2 \theta + B \sin^2 \theta$$

In either case, the first and second coefficient values A, B, respectively, for depth point DP at the interface shown in FIG. 1, will depend upon the relative elastic properties of formations 2, 4.

Figure 2:
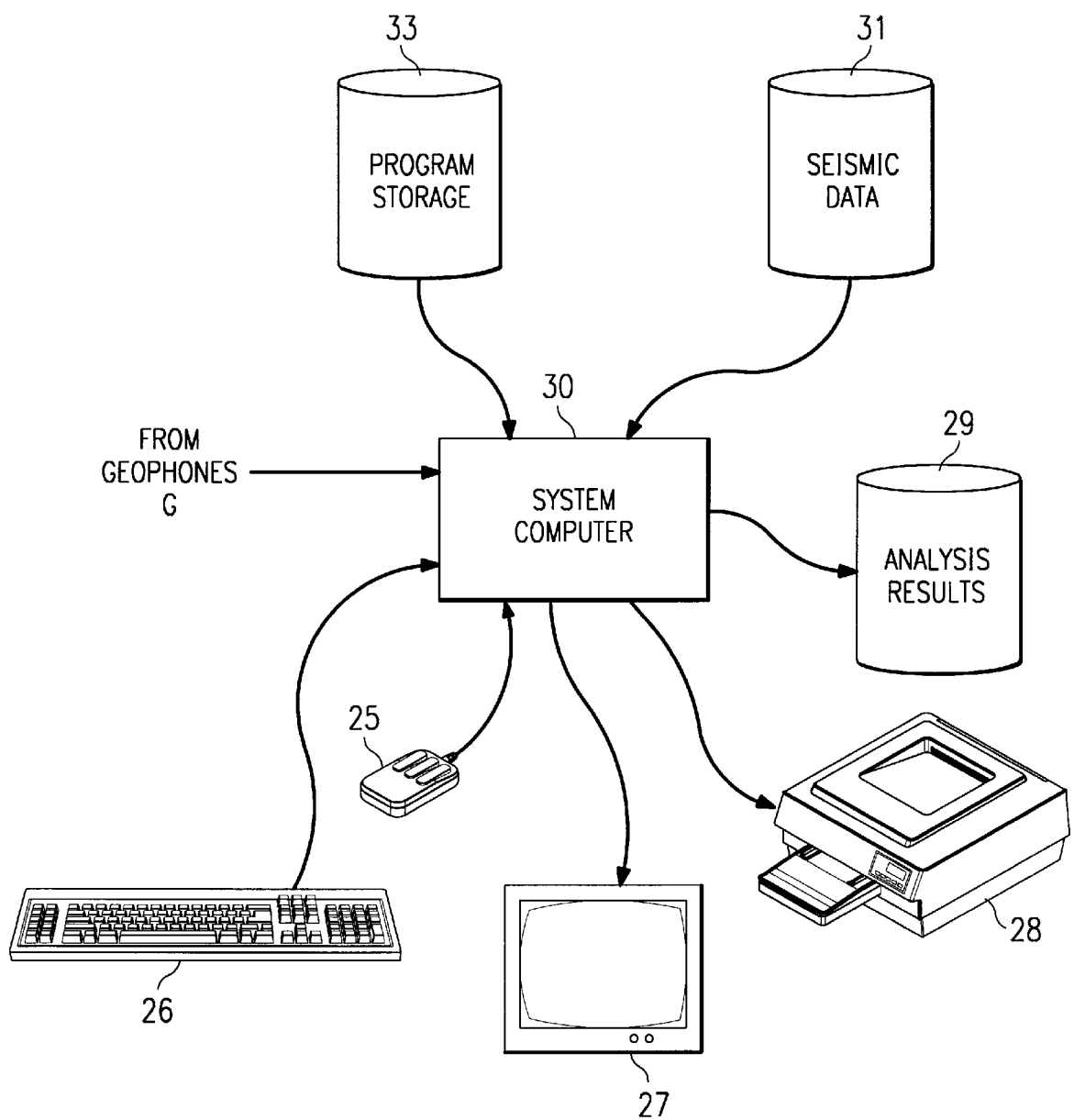
FIG. 2 is an electrical diagram, in block form, of a computer system for performing the preferred embodiment of the invention.

Referring now to FIG. 2, a computer system into which the preferred embodiment of the invention may be implemented, will be described. This system includes system computer 30, which may be implemented as any conventional personal computer or workstation, preferably a UNIX-based workstation such as a SPARCstation available from Sun Microsystems, Inc., implemented either in standalone fashion, or as part of a network arrangement. System computer 30 is in communication with disk storage devices 29, 31, and 33, which are preferably external hard disk storage devices in a network. It is contemplated that disk storage devices 29, 31, 33 are conventional hard disk drives, and as such will be implemented by way of a local area network or by remote access. Of course, while disk storage devices 29, 31, 33, are illustrated as separate devices, a single disk storage device may of course be used to store any and all of the program instructions, measurement data, and results as desired.

In this embodiment of the invention, seismic data from geophones G is stored on disk storage device 31, from which system computer 30 may retrieve the appropriate data to perform the analysis described hereinbelow, according to program instructions that correspond to the method described hereinbelow. For operation on system computer 30, the program instructions are written in the form of a computer program (e.g., in C++ or in another suitable language) stored in computer-readable memory, such as program disk storage device 33 of FIG. 2; of course, the memory medium storing the computer program may be of any conventional type used for the storage of computer programs, including hard disk drives, floppy disks, CD-ROMs and other optical media, magnetic tape, and the like.

According to the preferred embodiment of the invention, system computer 30 presents output primarily onto graphics display 27, or alternatively via printer 28; further in the alternative, system computer 30 may store the results of the analysis described hereinbelow on disk storage 29, for later use and further analysis. Keyboard 26 and pointing device (e.g., a mouse, trackball, or the like) 25 are provided with system computer 30 to enable interactive operation. As noted, system computer 30 is able to communicate with disk storage devices 29, 31, including external hard disk storage on a network and floppy disk drives. System computer 30 is typically located at a data center remote from the survey region.

In the example of a land-based survey, as shown in FIG. 1, system computer 30 is in communication with geophones G (either directly or via a recording unit, not shown), to receive signals indicative of the reflected seismic energy received thereat in the survey. These signals, after conventional formatting and other initial processing, are stored by system computer as digital data in disk storage 31 for subsequent retrieval and processing in the manner described hereinbelow. While FIG. 2 illustrates disk storage 31 as directly connected to system computer 30, it is also contemplated that disk storage device 31 may be accessible through a local area network or by remote access. Furthermore, while disk storage devices 29, 31 are illustrated as separate devices for storing input seismic data and analysis results, respectively, disk storage devices 29, 31 may of course be implemented within a single disk drive (either together with or separately from program disk storage device 33), or in any other conventional manner as will be fully understood by one of skill in the art having reference to this specification.

Figure 3:
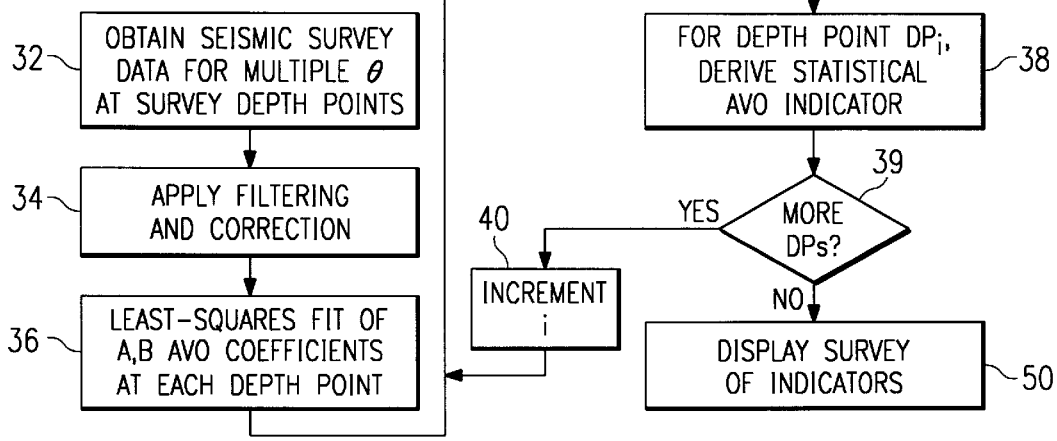
FIG. 3 is a generalized flow chart illustrating the process of analyzing seismic data according to the preferred embodiments of the invention.

Referring now to FIG. 3, a method of analyzing the seismic signals detected by a plurality of seismic receivers, in order to discern the presence and location of potentially hydrocarbon bearing formations in the earth according to the preferred embodiment of the present invention, will now be described. The method of FIG. 3 may be implemented into and performed by the computer system of FIG. 2, and also by computers of other conventional architecture.

The method of the preferred embodiment of the invention begins, in process 32, with the obtaining of seismic data for a survey region. For example, process 32 may be performed by a conventional seismic survey over the region of interest, so long as each depth point of interest in the survey has seismic data corresponding to multiple offsets and thus multiple angles of incidence. The maximum angle of incidence that will provide useful data for the preferred embodiment of the invention is contemplated to be around 40° from the normal, and the dominant frequency of the seismic energy should be at least about 25 Hz to provide useful seismic resolution. The seismic data obtained in process 32 preferably has all shot and receiver gathers cross-correlated with one another, such that a consistent statics solution may be obtained. The seismic data obtained in process 32 may come from either a newly performed survey or, alternatively, may use data from existing surveys that meet the above requirements. Referring to FIG. 3, system computer 30 completes process 32 by storing the obtained seismic data in disk storage 31 for later retrieval.

Process 34 is next performed, in which system computer 30 performs conventional filtering and correction processing upon the seismic data stored in disk storage 31. The filtering and correction performed by process 34 includes the application of multiple elimination, statics corrections, prestack migration, normal move-out (NMO) correction, and the desired filtering of the seismic signals. For example, ground roll filtering may be performed in process by way of a conventional 3D fan filter that preferably takes into account any irregular 3D geometry over which the seismic data are collected. The correction and filtering of process 34 are readily performed by system computer 30 according to conventional digital processing and filtering techniques.

Following process 34, the method continues with process 36, which generates AVO coefficients A and B for each depth point in the survey. As evident from the schematic survey of FIG. 1 and as known in the art, each depth point in the survey corresponds to a sample point in time underlying a surface location, and thus corresponds to a sample point in time along a conventional seismic trace. Process 36 is preferably performed by system computer 30 according to this embodiment of the invention, for each of many depth points associated with each survey surface location, using a least-squares fit of the amplitude of the seismic traces corresponding to that depth to derive an AVO intercept value A and an AVO gradient value B for the particular depth point. According to this preferred embodiment of the invention, process 36 is performed by retrieving a CDP gather of seismic traces of varying offset. The traces in the retrieved gather will thus have seismic signals corresponding to the reflection of acoustic energy from multiple common depth points underlying the same midpoint surface location, with the varying offset providing each depth point with signals at multiple angles of incidence θ. System computer 30 then performs regression upon the traces in gather to provide a least-squares fit of A and B at the two-way time $t_i$ corresponding to the common depth points. In effect, process 36 effectively "stacks" the records from the multiple offsets to form a composite record reflected in the values of the A and B coefficients.

Varying AVO models may be used in the least-squares regression. Typically, as noted above, AVO analysis is done using the conventional two-term model:

$$R(\theta) = A + B \sin^2 \theta$$

Alternatively, other conventional or alternative models used in amplitude-versus-offset analysis, such as the two-term model $R(\theta) = A \cos^2 \theta + B \sin^2 \theta$, may be used in connection with, and benefit from, the present invention; in the case of the $R(\theta) = A \cos^2 \theta + B \sin^2 \theta$ model, the first and second coefficients A and B would be estimated in process 36 for each depth point $DP_i$ in the survey. Further in the alternative, regression according to another AVO model that includes a third term, $C(t_i) \sin^2 \theta \tan^2 \theta$, may be used, as described in the above-referenced U.S. Pat. No. 5,661,617. Use of this third term, and thus solution for the coefficient C, has been observed to improve the accuracy of the estimated AVO slope B to the true defined AVO gradient B, as compared to the simpler two-term model. Other processing, such as offset-dependent tuning may also be performed at this time.

Process 36 is then repeated for each depth point under each surface location in the survey area, based on the multiple-offset data provided therefor. As a result of process 36, each depth point in the survey is associated with an AVO intercept value A and an AVO slope, or gradient, value B, thus providing survey sections of both the AVO intercept value A and the AVO gradient value B. These A and B values will typically be complex numbers, to convey phase information regarding the reflections. For example, complex or analytical traces for each of the A and B AVO coefficients are typically created by applying the Hilbert transform to the measured A and B time-domain traces, with the resultant complex trace for each coefficient having a real component corresponding to the measured values over time, and an imaginary component corresponding to the Hilbert transform of the measured values over time. If desired, a set of traces or data points of the AVO coefficients A and B (typically the real components of the analytical traces) may be generated, and displayed in a coordinate system having surface location and time axes (i.e., in CMP-time space).

If desired, corrections to the A and B survey sections derived in process 36 may now be performed. For example, as described in U.S. Pat. No. 5,258,960, issued Nov. 2, 1993, assigned to Atlantic Richfield Company and incorporated herein by this reference, conventional NMO corrections introduce a predictable error in the AVO slope values B, due to the well-known NMO "stretch" effects on seismic response with increasing offset. The predictable nature of the error in AVO slope values due to NMO stretch are thus removed in process 57, preferably in the manner described in the above-incorporated U.S. Pat. No. 5,258,960. Alternatively, filtering may performed according to the technique described in U.S. Pat. No. 4,995,007, incorporated herein by this reference.

Figure 4:
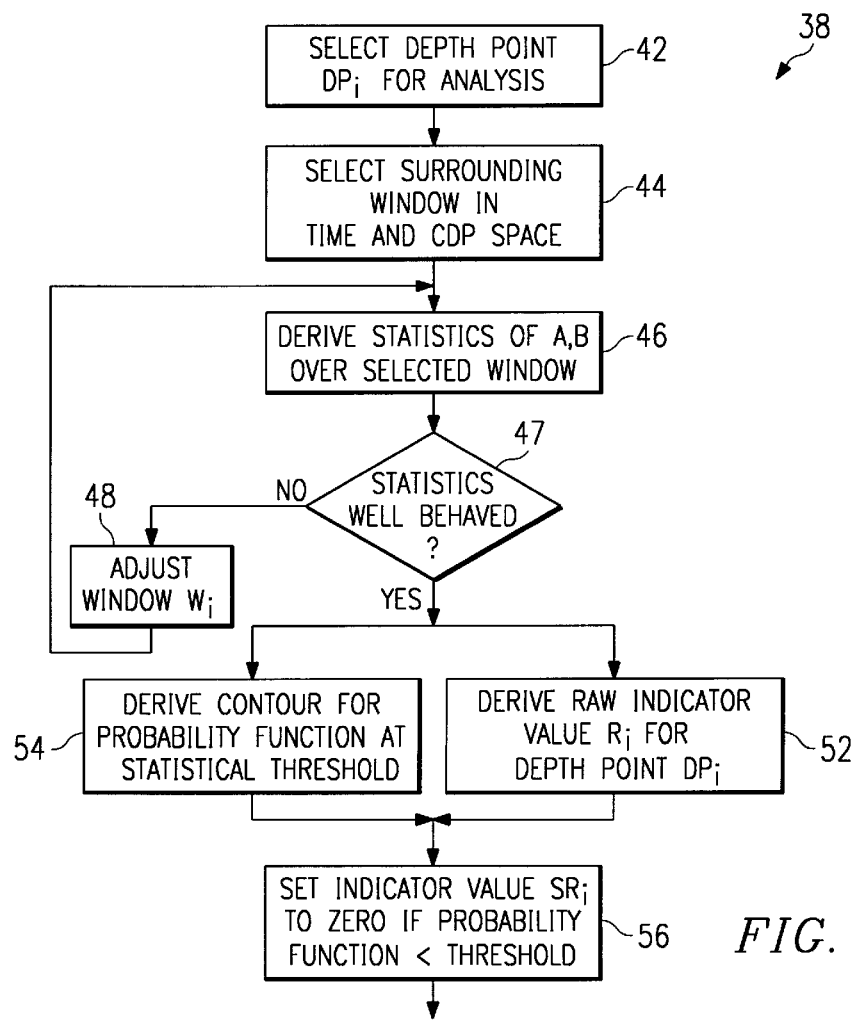
FIG. 4 is a flow chart illustrating the process of deriving a statistical AVO indicator for a depth point in the process of FIG. 3, according to a first preferred embodiment of the present invention.

Following least-squares fit process 36 and such additional filtering and correction to the A, B sections as desired, process 38 is performed according to the preferred embodiment of the invention to derive, for each depth point $DP_i$, a value of a statistical AVO indicator. This indicator may be used by the human analyst to identify those depth points that may correspond to hydrocarbon-bearing locations or to other locations of petrophysical interest. Referring now to FIG. 4, the operation of system computer 30 in performing process 38 according to a first embodiment of the invention will now be described in detail.

Figure 5:
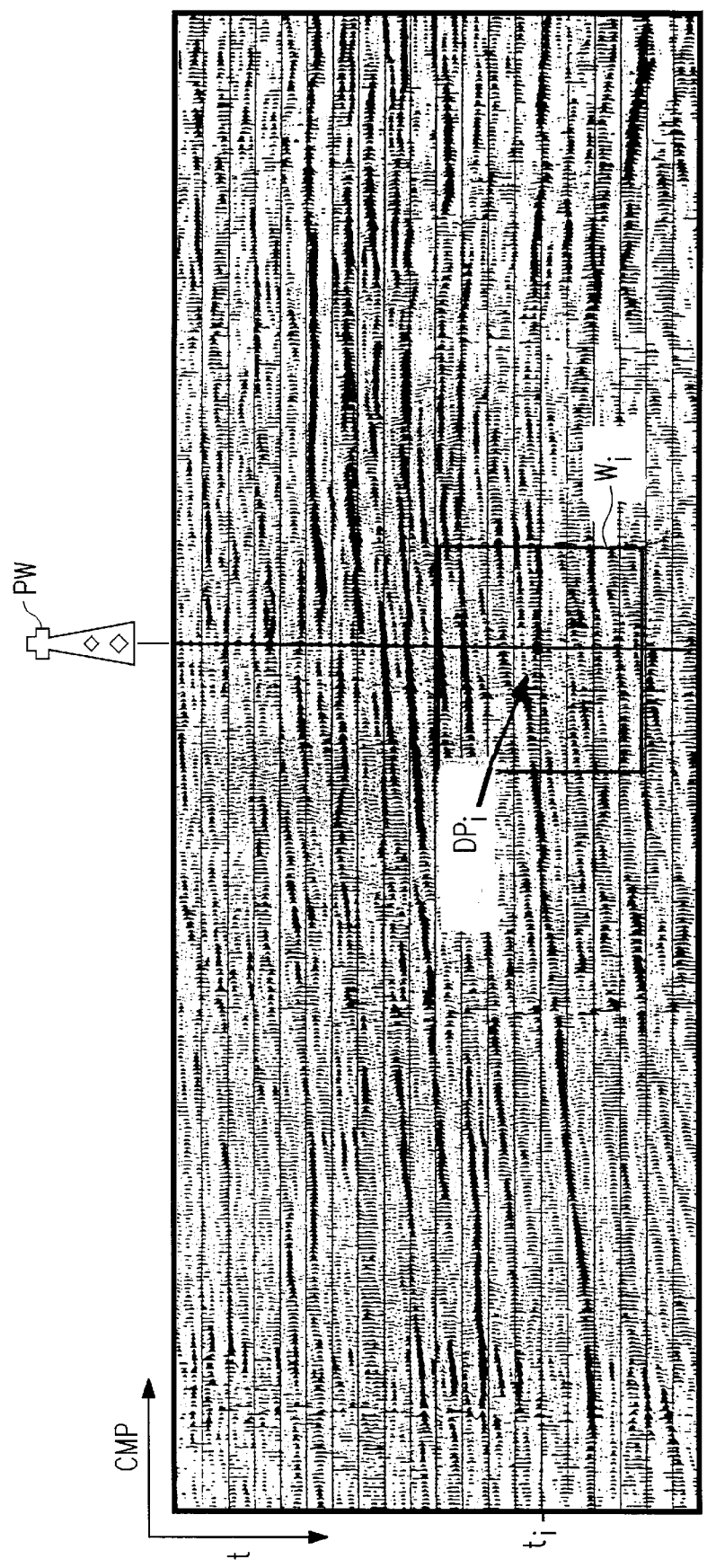
FIG. 5 is a portion of a seismic survey illustrating the selection of a window in time and distance as used in the process of FIG. 3.

Process 38 begins, in process 42, with the selection of a first depth point $DP_i$ for which the statistical AVO indicator will be determined. As will be evident from the following description, each of the depth points in the survey will be similarly analyzed, such that survey sections of the indicator values for each point in CMP-time space may be plotted. Once depth point $DP_i$ has been selected, a window $W_i$ that surrounds depth point $DP_i$ is selected in process 44. FIG. 5 illustrates an exemplary depth point $DP_i$ in CMP-time space that has been selected in process 42; in this example, depth point $DP_i$ corresponds to time $t_i$ underlying a surface location (i.e., a point along the CMP axis) corresponding to potential well PW. In FIG. 5, depth point $DP_i$ is surrounded by an exemplary associated window $W_i$ selected in process 44. This window $W_i$ extends for a desired distance on both sides of potential well location PW along the CMP axis, and extends for a desired delay time on both sides of time $t_i$ along the time axis. Selection of the desired size of window $W_i$ will be described in further detail hereinbelow.

Process 46 is next performed by way of which the statistics of the AVO intercept value A and AVO slope value B for each depth point within window $W_i$ are derived by system computer 30, for purposes of evaluating whether window $W_i$ is properly selected. In process 46, system computer 30 retrieves the A and B values for each depth point in window $W_i$. Based upon these retrieved values, system computer 30 derives certain statistics corresponding to the correlation and spread of the depth points of window $W_i$ in A-B space.

An example of the determination of such statistics for a group of points in A-B space is described in U.S. Pat. No. 5,515,335. According to this approach, system computer 30 determines, in process 46, several important statistical characteristics of the values of A and B for each depth point in window $W_i$, including the root-mean-square (RMS) amplitudes $\sigma_a$, $\sigma_b$, respectively, and also the correlation coefficient r over the window $W_i$. These calculations are preferably made using the complex, or analytical, form of traces A(t), B(t) for each surface location, generated as the sum of real traces for the A and B values over time (i.e., A(t), B(t), respectively) and the square root of −1 times their respective Hilbert transform. The RMS amplitudes ($\sigma_a$, $\sigma_b$ are derived, in process 46, according to the following equations:

$$\sigma_a = \frac{\sqrt{\sum_k w_k |A_k|^2}}{\sum_k w_k}$$

$$\sigma_b = \frac{\sqrt{\sum_k w_k |B_k|^2}}{\sum_k w_k}$$

where the index k refers to the $k^{th}$ depth point within window $W_i$ where $|A_k|$ and $|B_k|$ are the magnitudes of the coefficients at the $k^{th}$ depth point, and where $w_k$ is a weighting factor for the $k^{th}$ sample within window $W_i$ determined by:

$$W_k = [|A_k|^2 + |B_k|^2]^{-Q}$$

Q is a weighting exponent which governs the relative contribution, to the data statistics, of strong and weak seismic reflectors. The unweighted case (Q=0) is suitable for many situations; alternatively, the weighting factor may vary to select the balance of strong and weak events, depending upon the particular geological conditions of the survey. System computer 30 also determines a correlation coefficient r in process 46, according to the following relationship:

$$r = \frac{1}{\sigma_a \sigma_b} \frac{\sum_k w_k A_k B_k^*}{\sum_k w_k}$$

where $B_k^*$ is the value of the complex conjugate of the AVO slope B at the $k^{th}$ depth point in window $W_i$.

Upon completion of process 46 in which the statistics are derived for the points within window $W_i$, decision 47 is performed by system computer 30 to determine if the statistics calculated in process 46 are sufficiently well-behaved that use of window $W_i$ will provide an accurate result. For example, as noted above, the values of the A and B coefficients are typically negatively correlated with one another; as such, the value r determined in process 46 should be a negative number close to −1. In addition, the values of $\sigma_a$, $\sigma_b$ are analyzed in decision 47 to ensure that the points in A-B space are not too scattered. Qualitatively, decision 47 determines whether window $W_i$ is of the right size. If, for example, window $W_i$ is too large, there may be no clear trend of the A and B values from which deviations may be discerned; conversely, if window $W_i$ is too small, depth points having significant deviations will not be visible (as such deviations will in fact become the trend background). By way of another example, if the value of correlation coefficient r is near zero, but the RMS amplitudes $\sigma_a$, $\sigma_b$ are approximately of equal magnitude, the choice of trend line will be quite arbitrary. If the statistics of window $W_i$ are not sufficiently well-behaved, process 48 is performed by way of which window $W_i$ is adjusted to be smaller or larger, depending upon the nature of the statistics calculated in the most recent pass of process 46. Statistical calculation process 46 is then repeated for the adjusted window $W_i$, until the statistical values provide an indication of reliable results.

Once decision 47 determines that window $W_i$ selected in process 44 (or adjusted in process 48) is appropriate, processes 52, 54 are performed by system computer to derive the statistical indicator for depth point $DP_i$ currently under analysis. As will be evident from the following description, and as suggested by their parallel representation in FIG. 4, the order in which processes 52, 54 are performed is unimportant, as the two attributes are generally independent of one another.

Process 52, performed by system computer 30, derives a raw AVO indicator value $R_i$ for the depth point of interest $DP_i$. As noted hereinabove, several AVO indicators are known in the art, by way of which petrophysically interesting formations and interfaces may be detected in seismic surveys. Typically in the art, AVO indicators are selected so as to provide positive values for potential hydrocarbon-bearing locations, such that conventional "wiggle" traces (which display positive amplitude values by filled curves, and negative amplitude by unfilled curves) may be used to readily identify interesting depth locations based upon the AVO indicator.

Figure 6:
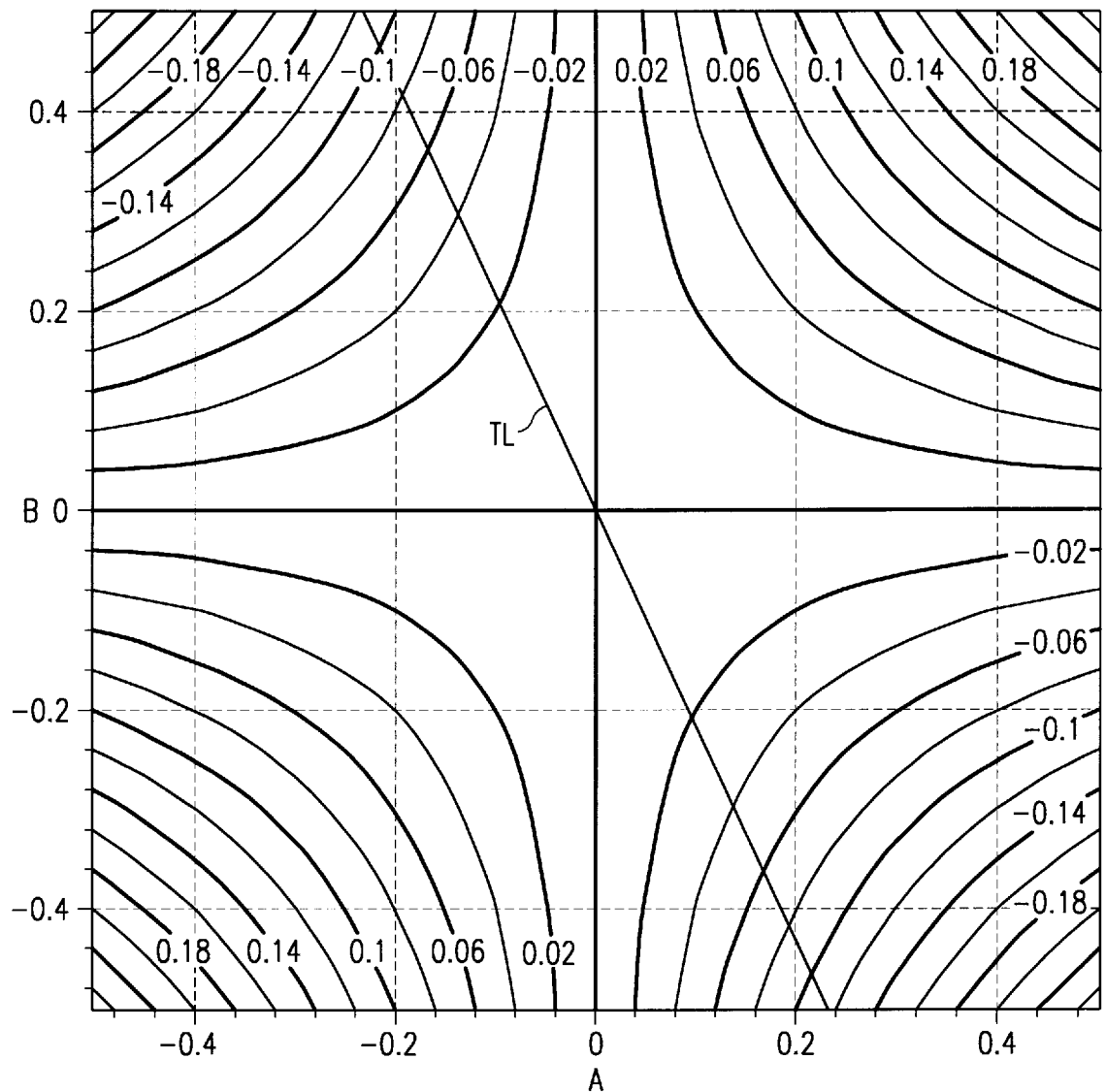
FIG. 6 is a plot, in the A-B plane, of a typical AVO indicator based upon the multiplicative product of the A and B coefficients as may be used in connection with the present invention.

FIG. 6 illustrates one well known indicator, which is based upon the arithmetic product of the A and B coefficients. Often, this indicator is the product of the AVO intercept value A with the complex conjugate of the AVO slope B in its analytical, or complex, form, so as to eliminate phase dependencies. As shown in FIG. 6, this indicator value is dependent strictly upon the A, B values for the depth point, without regard to the underlying trend (shown as a straight line by trend line TL). This indicator is based upon the assumption that the AVO coefficients A, B are negatively correlated with one another in the wet elastic formations, such that the product of the A and B coefficients, when negatively-valued, indicates depth points in the background, but that depth-points having positive values (i.e., where the A, B coefficients are not negatively correlated) may indicate petrophysically interesting locations.

Other AVO indicators are also known in the art. A particularly useful example of such an indicator is described in the above-incorporated copending application Ser. No. 08/614,744. This new AVO indicator is based upon the rate of change of the product of the AVO intercept value and the AVO gradient value for the depth point under analysis, taken along the direction of a deviation vector of the AVO intercept value and the AVO gradient value from the background trend of points in the window $W_i$ and as such the indicator value for the depth point of interest $DP_i$ is dependent upon the slope of the trend line TL, in contrast to the simple product indicator of FIG. 6. Another example of an AVO indicator is also described in the above-incorporated copending commonly assigned U.S. Pat. No. 5,661,617, filed Dec. 18, 1995.

The AVO indicator described in the above-incorporated copending application Ser. No. 08/614,744, pending, is preferred for use in process 52 to derive the AVO indicator value $R_i$, as it provides additional visibility and accuracy over the simple product indicator, especially at greater depths such as encountered for Class 1 and Class 2 gas-bearing sands. However, process 52 may derive raw AVO indicator $R_i$ for depth point $DP_i$ according to any technique, including the simple product indicator.

Referring back to FIG. 4, system computer 30 evaluates, in process 54, the probability function for each depth point in window $W_i$ from which the statistics r, $\sigma_a$, $\sigma_b$ were derived in process 46. The purpose of process 54 is to determine one or more probability contours, in the A-B plane, that define the probability that any particular depth point in window $W_i$, including depth point $DP_i$ is a member of the distribution upon which the statistics r, $\sigma_a$, $\sigma_b$ are based. Of course, the probability function evaluated in process 54 will depend upon the type of distribution assumed for the depth points in window $W_i$ as plotted in the A-B plane. According to the preferred embodiment of the invention, the distribution of the AVO coefficients A, B are assumed to be jointly normal, so that their probability density function will be of the form:

$$f(A, B) = \frac{1}{2\pi\sigma_a\sigma_b\sqrt{1-|r|^2}} \exp\left[-\frac{1}{2(1-|r|^2)} Z(A, B)\right]$$

where $$Z(A, B) = \frac{|A|^2}{\sigma_a^2} - \frac{2}{\sigma_a\sigma_b}\mathcal{R}\{r^*AB^*\} + \frac{|B|^2}{\sigma_b^2}$$

Abramowitz and Stegun, *Handbook of Mathematical Functions* (Dover Publications, 1965), p. 936. Again, as noted above, the time-dependent representations of the AVO intercept A(t) and AVO gradient B(t) are the complex generalizations, given by the following:

$$A(t)=A_r(t)+i\ \mathcal{H}\{A_r(t)\}$$
$$B(t)=B_r(t)+i\ \mathcal{H}\{B_r(t)\}$$

where $A_r(t)$ and $B_r(t)$ are the time-domain representations of the AVO intercept and gradient coefficients for a surface location as determined in process 36, and where $\mathcal{H}$ indicates the Hilbert transform operator, with i being the complex operator $\sqrt{-1}$.

The equation for Z(A,B), when set equal to a constant, defines an ellipse of constant probability density, as is well known for jointly normal distributions. Substituting a constant c for the Z(A,B) term in the definition of the probability function $f(A,B)$ set forth above, one may integrate the function $f(A,B)$ to provide a cumulative probability function P(A,B), dependent upon the correlation constant r, which represents the fraction of points in the jointly normal distribution that lie within an elliptical contour. The cumulative probability function P(A,B) will thus be expressed as follows:

$$P(A, B) = 1 - \exp\left[-\frac{1}{2(1-|r|^2)} c\right]$$

Abramowitz and Stegun, *Handbook of Mathematical Functions* (Dover Publications, 1965), p. 940. The percentile class will, of course, be the value of 100P(A,B).

Figure 7:
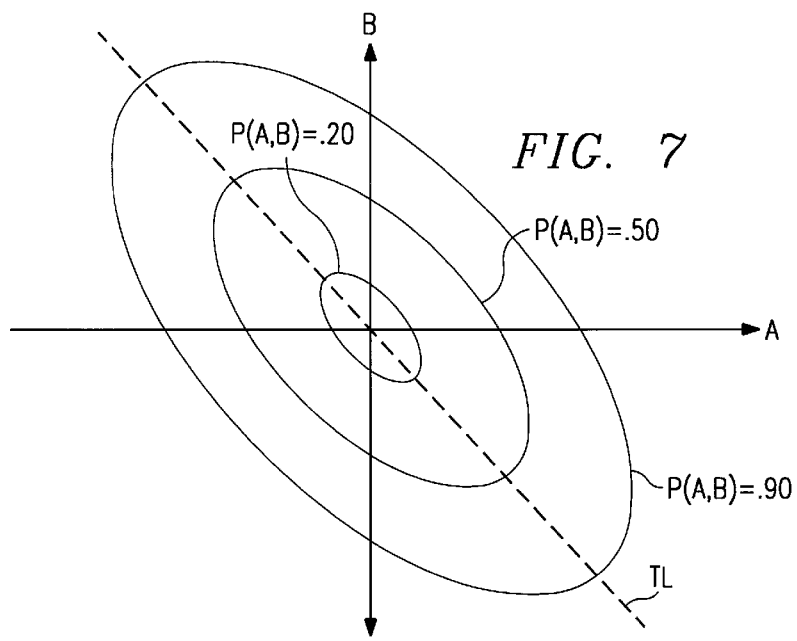
FIG. 7 is a plot, in the A-B plane, of an example set of statistical contours for a jointly normal distribution of background A and B values.

One may thus draw contours of P(A,B) in the A-B plane based upon the statistics r, $\sigma_a$, $\sigma_b$ for a window $W_i$, with each contour corresponding to a boundary within which a given fraction of the depth points in the window $W_i$ lie. For the jointly normal assumption, as noted above, these contours will be ellipses having a trend line as the major axis. FIG. 7 illustrates examples of such contours in the A-B plane for an exemplary distribution of points. Trend line TL corresponds to a line in the A-B plane having a slope equal to the correlation coefficient r (which, for typical geological surveys, is negative). In the example of FIG. 7, three contours of the cumulative probability function P(A,B) are shown, for the fractional values 0.20, 0.50, and 0.90. By way of explanation, 90% of the points lie within the ellipse indicated as P(A,B)=0.90, while 20% of the points lie within the ellipse indicated as P(A,B)=0.20.

Accordingly, in process 54 of FIG. 4, system computer 30 evaluates the probability function P(A,B) for a selected threshold value, for the points in the window $W_i$ surrounding the depth point of interest $DP_i$ using the statistics derived in process 46. According to the preferred embodiment of the invention, a threshold fraction value is preselected, based upon the statistical significance desired in order to identify an indicator value of importance.

Upon completion of processes 52, 54, system computer 30 next performs process 56 according to the first preferred embodiment of the invention, in which the AVO indicator $R_i$ derived in process 52 for depth point $DP_i$ is combined with the statistical threshold determined for the points in window $W_i$ surrounding depth point $DP_i$. Process 56 modifies the value of AVO indicator $R_i$ according to its proximity to the jointly normal distribution of points in the A-B plane corresponding to the background; in this first embodiment of the present invention, the threshold value used in process 56 to derive the cumulative probability function P(A,B) is applied to the value of the raw AVO indicator $R_i$ to derive a modified AVO indicator $SR_i$ that has a positive value only for points outside of the probability function contour P(A, B). As a result, the modified AVO indicator $SR_i$ identifies, by positive values, those depth points $DP_i$ that have both an interesting raw AVO indicator value $R_i$ and also can be considered to be outside of the background trend with some statistical confidence.

Figure 8:
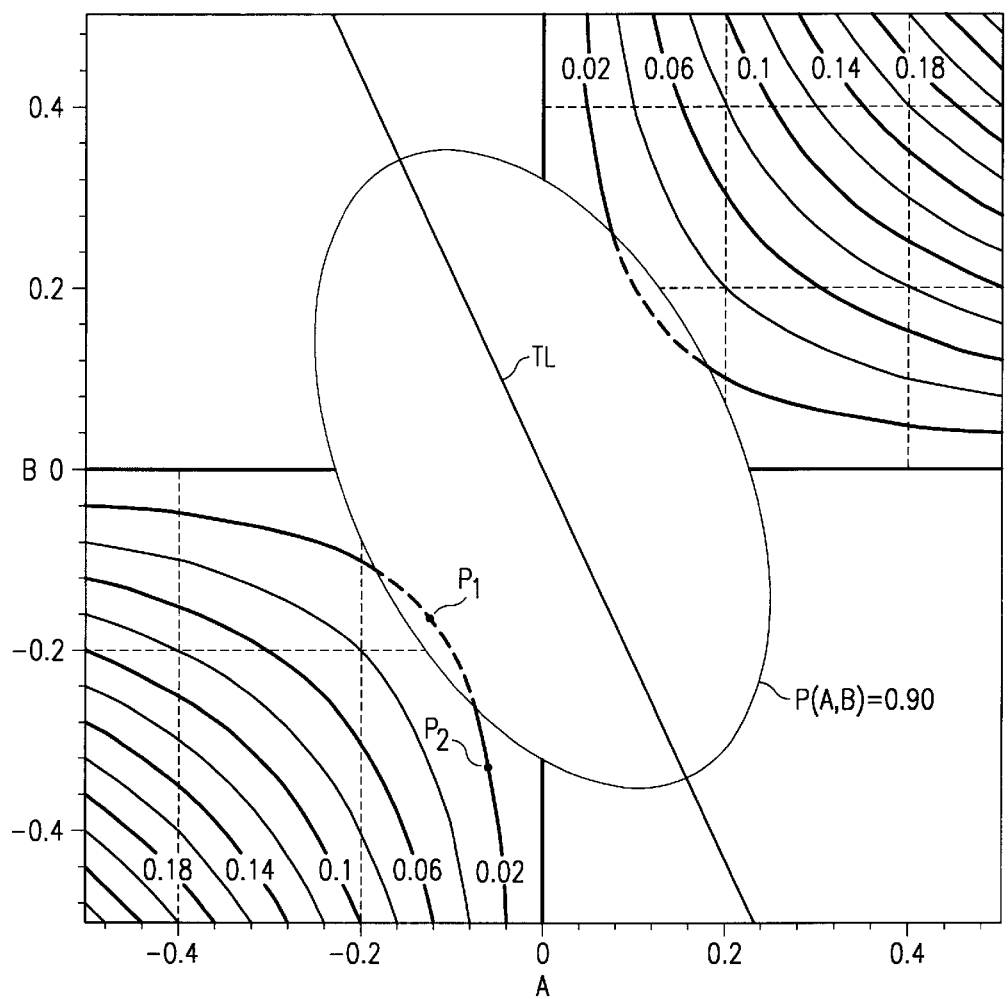
FIG. 8 is a plot, in the A-B plane, of an example of a statistical AVO indicator generated according to the first preferred embodiment of the invention.

FIG. 8 illustrates the application of the thresholding of process 56 for isovalued contours of the raw AVO indicator AB (i.e., the product of the A and B coefficients, as previously discussed relative to FIG. 6. The negatively valued contours of this indicator have been removed, as these values are generally considered to be within the background trend (where the A and B coefficients are negatively correlated). In this example, the contour used is P(A,B)= 0.99, meaning that only 1% of the points in a jointly normal distribution, having a trend line TL corresponding to the coefficient r and RMS amplitudes $\sigma_a$, $\sigma_b$, are expected to reside outside of the elliptical contour.

According to this example, the modified AVO indicator $SR_i$ is obtained merely by the following rules:

$SR_i = R_i$; for points outside of P(A,B)=0.99

$SR_i = 0$; for points inside of P(A,B)=0.99

$SR_i = 0$, for all $R_i < 0$

In the example of FIG. 8, points $P_1$ and $P_2$ each have a raw AVO indicator $R_i$ of 0.02. Point $P_1$ is within the specified threshold contour of P(A,B)=0.99, however, and as such it is considered to be within the background trend; the modified AVO indicator value $SR_i$ for point $P_i$ will thus be set to zero, in this example. Since point $P_2$ is outside of the threshold contour of P(A,B)=0.99, however, its modified AVO indicator value $SR_i$ will be 0.02 (equal to the value of its raw AVO indicator $R_i$).

According to this first embodiment of the invention, therefore, depth points $DP_i$ will have an AVO indicator value assigned thereto that not only is indicative of petrophysical interest, but is also assured, to some statistical confidence, to be outside of the statistical distribution of the background points in its surrounding window $W_i$. Accordingly, it is contemplated that the number of "false positive" depth points in an AVO indicator survey will be much reduced.

Referring now to FIG. 9, process 38' for deriving a statistical AVO indicator according to a second preferred embodiment of the invention will now be described in detail. According to this second preferred embodiment of the invention, the statistical confidence with which a particular depth point of interest $DP_i$ is considered to be outside of the background trend is utilized to modify the value of the raw AVO indicator $R_i$ in a more quantitative sense, as opposed to a simple threshold determination which may, especially in some circumstances, be rather arbitrary.

The initial steps in process 38' according to this second embodiment of the invention are performed by system computer 30 similarly as in the case of process 38 described hereinabove relative to FIG. 4. Briefly, these steps include the selection of a depth point $DP_i$ in process 42 and selection of window $W_i$ surrounding depth point $DP_i$, in process 44. As before, process 46 is performed by system computer 30 to derive the statistics of the AVO intercept value A and AVO slope value B for each depth point within window $W_i$. Decision 47 and adjustment step 48 are performed, as before, to ensure that the window $W_i$ is properly selected.

According to this second embodiment of the invention, system computer 30 next performs process 54' to determine the value of the probability function $P_i(A,B)$ for the depth point of interest $DP_i$, based on its values of AVO intercept A and AVO gradient B. Again, either the original measured values of the A, B coefficients or, alternatively, the complex or analytical AVO coefficients A, B, may be used to derive the value of $P_i(A,B)$ for depth point $DP_i$. Process 52 is then performed, as before, to derive the raw AVO indicator value $R_i$ for depth point $DP_i$; again, the particular AVO indicator derived may be the simple product indicator, the indicator described in the above-incorporated copending application Ser. No. 08/614,744, pending, or any other known AVO indicator based upon the intercept and gradient coefficient values.

As before, the order in which processes 52, 54' are performed is not important. Accordingly, while FIG. 9 illustrates that process 54 is performed prior to process 52', the order may be reversed if desired, considering that the values derived in these processes are independent of one another.

According to this second embodiment of the invention, a combined statistical AVO indicator is next produced by system computer 30 in process 58, based upon the values of the probability function $P_i(A,B)$ and the raw AVO indicator $R_i$ derived in processes 52, 54' for depth point $DP_i$. The combined indicator produced in process 58 is a quantitative combination of the values for depth point $DP_i$, and as such may be generated in a multitude of ways. According to this second preferred embodiment of the invention, process 58 generates a combined statistical AVO indicator $PR_i$ from the product of the values of the probability function $P_i(A,B)$ and the raw AVO indicator $R_i$, with the value of the probability function $P_i(A,B)$ raised to a selected power:

$PR_i = R_i P_i(A,B)^p$

The value of exponent p is selected according to the desired degree of suppression of points within the statistical scatter of the background trend.

Figure 10B:
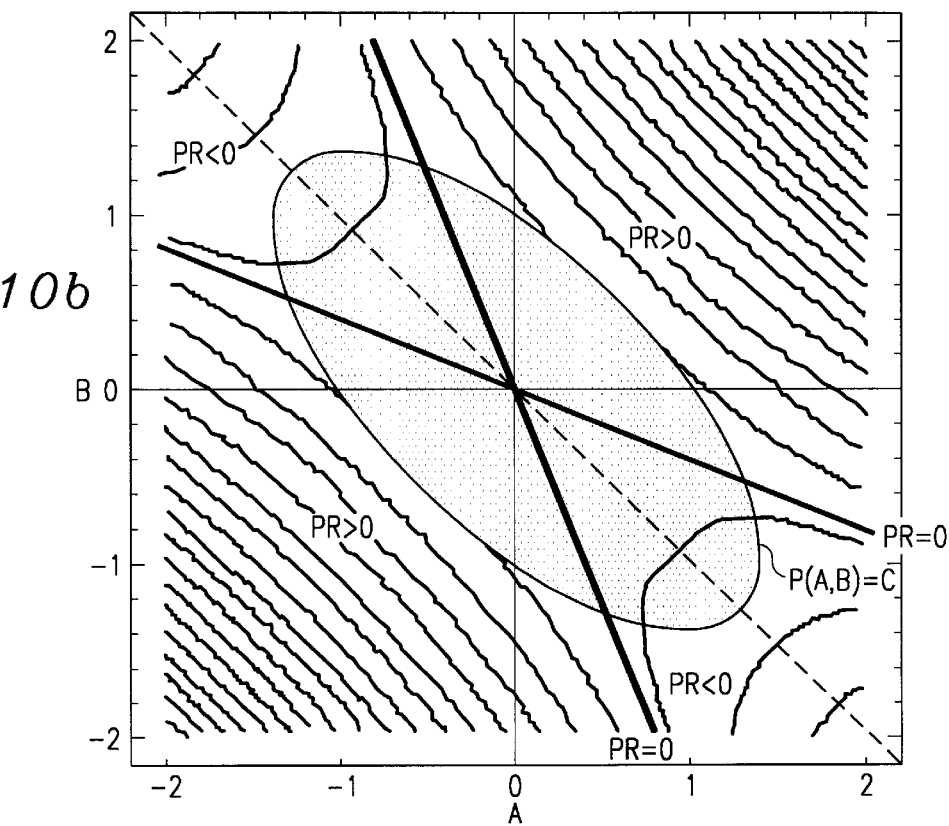
FIG. 10b and 10c are plots, in the A-B plane, of examples of a combined statistical AVO indicator based upon the raw AVO indicator plotted in FIG. 10a and produced according to the second preferred embodiment of the present invention.
Figure 10C:
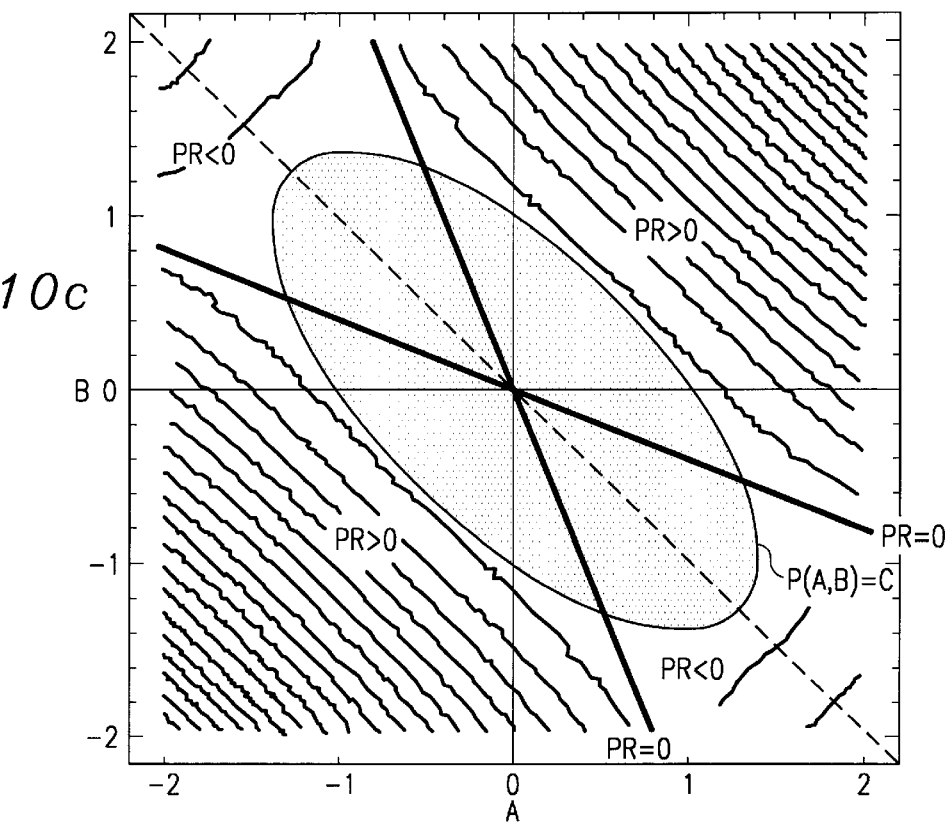

Referring now to FIGS. 10a through 10c, examples of the generation of the combined statistical AVO indicator according to this second preferred embodiment of the present invention will now be described. FIG. 10a illustrates the behavior of the raw AVO indicator R generated according to the method described in the above-referenced copending application Ser. No. 08/614,744, pending, for a given jointly normal distribution of points in a window W surrounding a depth point $DP_i$. An elliptical contour P(A,B)=c is illustrated, to show the distribution of points in the A-B plane from which the probability function may be evaluated. FIG. 10a illustrates, with the bold straight lines, the loci of points for which the raw AVO indicator R=0; points within the second and fourth quadrants between the R=0 lines have negatively-valued R indicators, while the points in the first and third quadrants, and points in the second and fourth quadrants outside of the R=0 lines have positively-valued $R_i$ indicators. Isovalue contour lines are also illustrated for the values of the raw AVO indicator $R_i$.

As evident from FIG. 10a, certain isovalue contours of the raw AVO indicator R enter the shaded ellipse of P(A,B)=c. This indicates that points may exist which have positive raw AVO indicator values but which are within the statistical distribution of the points in the corresponding window $W_i$. As described above, it is thus ambiguous as to whether these points are truly petrophysically interesting or are instead merely expected points within the scatter of the A, B values for the background distribution.

FIG. 10b illustrates the behavior of combined statistical AVO indicator PR generated according to this second preferred embodiment of the invention, for the case where the exponent p=1. As is evident from FIG. 10b, the isovalue contours of PR in the first and third quadrants are moved out of the elliptical statistical contour P(A,B)=c; this, of course, is due to the devaluing of the combined statistical AVO indicator PR for points in the A-B plane near or within the background scatter of points in window $W_i$. In particular, it is evident from FIG. 10b that ambiguous points, within the statistical contour P(A,B)=c but on a positively-valued contour of the AVO indicator, are eliminated.

FIG. 10c illustrates the case similar to that of FIG. 10b, but where the exponent p=4. In this case, the isovalue contours of the combined statistical AVO indicator PR are repelled from the elliptical statistical contour P(A,B)=c, due to the extreme (fourth power) devaluing of the AVO indicator for points near or within the background scatter.

It is contemplated, according to this second preferred embodiment of the invention, that the selection of the value of the exponent p may be made by one of ordinary skill in the art for the particular survey under analysis.

Referring back to FIG. 3, the remainder of the process for generating an AVO survey, applicable to the results of either of the first or second preferred embodiments of the invention, will now be described.

As evident in FIG. 3, process 38 is performed for an individual depth point $DP_i$, following which system computer 30 determines, in decision 49, whether additional depth points remain to be similarly analyzed. If so, the index i is incremented in process 40, and process 38 is repeated to derive a statistical AVO indicator ($R_i$ or $PR_i$, as the case may be) for the next depth point $DP_i$ in the survey. At such time as a statistical AVO indicator has been derived for all depth points $DP_i$ of interest in the survey (i.e., decision 49 returns a NO result), system computer 30 is able to display or otherwise output a survey of the statistical indicators as a function of location and time or depth, for example on graphics display 27 or printer 28. The output survey from process 40 is preferably displayed in color or in some other suitable fashion to allow the human analyst to readily identify those depth point locations in the survey having petrophysically interesting indicator values that are of statistical validity. Examples of such a survey will be provided hereinbelow.

One such example would be used in combination with either of the first or second embodiments described hereinabove, in which the modified AVO indicator value SR or PR, as the case may be, would be plotted as amplitude over time (or depth) in the form of a trace associated with each surface location in the survey area. In this way, the thresholding or modifying of the AVO indicator would serve as a filter, such that only petrophysically interesting locations (i.e., having a positive AVO indicator amplitude) that are also not within the statistically predicted scatter of background points with some degree of confidence will be shown.

Figure 11A:
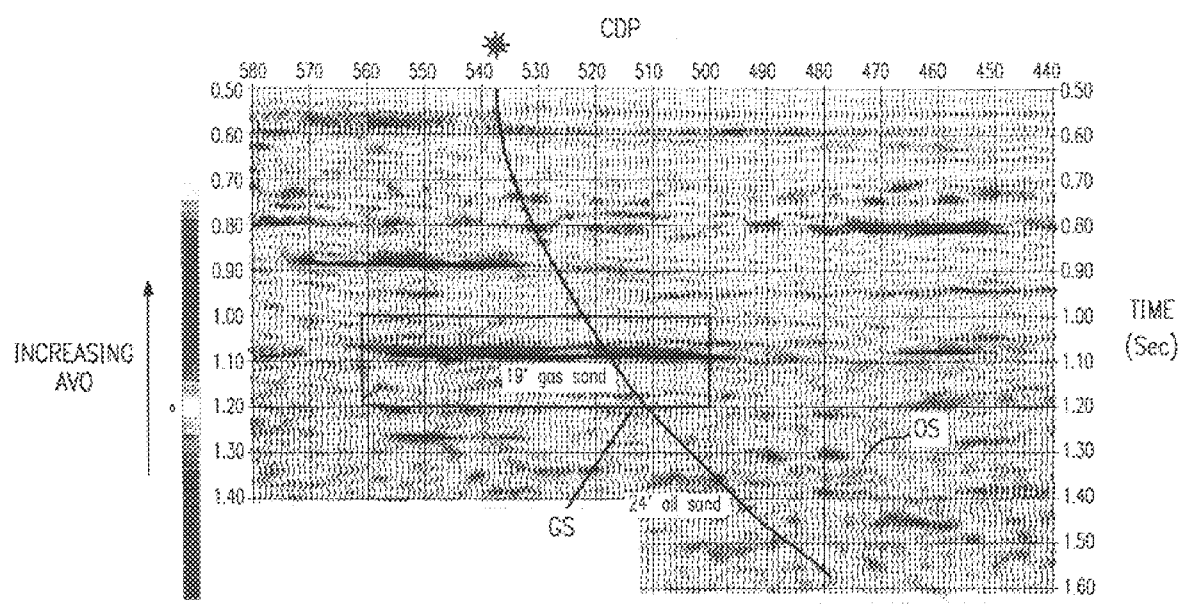
FIG. 11a is a survey plot illustrating an AVO survey.
Figure 11B:
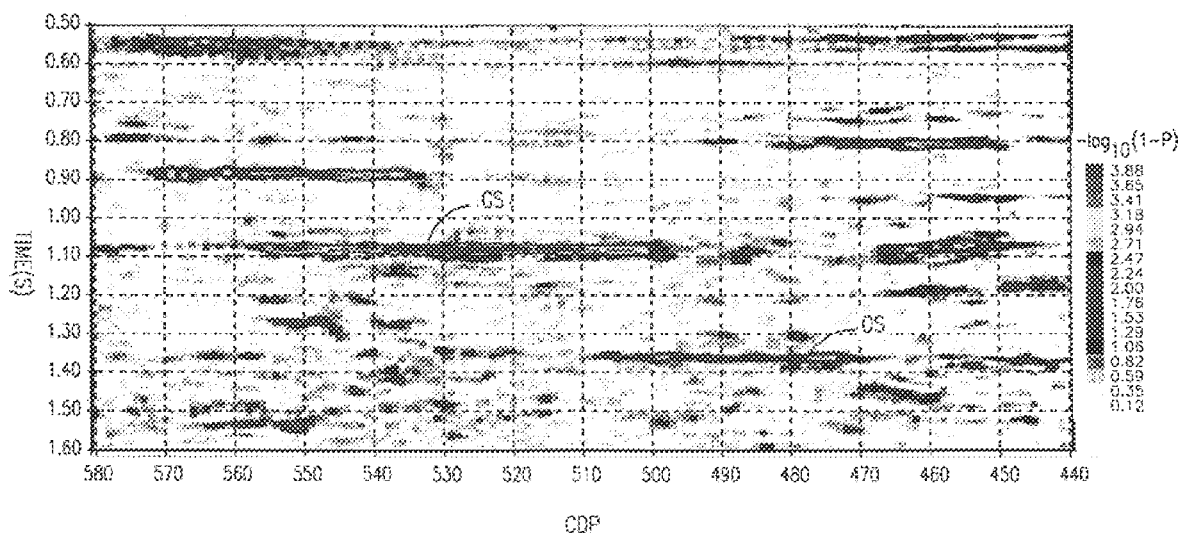

Referring now to FIGS. 11a and 11b, an example of the effect of the preferred embodiment of the invention upon actual AVO survey data will be described. In FIG. 11a, an AVO survey is illustrated for a region of the earth, using the raw AVO product indicator AB* and not incorporating the statistical approach described hereinabove. Stacking velocity corrections have been applied to this survey, to eliminate small velocity errors in the AVO traces. The AVO intercept A is plotted over time by the underlying wiggle traces, with values of the conventional AVO indicator AB* overlying the wiggle traces in color. As indicated by the color key, depth points at which the AVO indicator AB* is positive are illustrated by the red and yellow hues, AVO indicator values of approximately zero have no color overlay, and negatively valued AVO indicators are shown in blue and green. A strong indication of a gas sand GS is indicated by this survey by the corresponding red and yellow AVO indicator values. However, an oil-bearing sand OS is only slightly indicated in this conventional AVO survey, as the AVO indicator AB* has only slightly positive values at the location of oil sand OS.

FIG. 11b is a plot of the statistical probability function value for each of the depth points, generated according to the preferred embodiment of the invention described hereinabove. As indicated by the color key of FIG. 11b, only the probability function value is plotted, with no relationship to the AVO indicator value itself. In the example of FIG. 11b, the color code corresponds to $-\log_{10}(1-P)$, such that a probability function value of 0.90 is indicated by a strong violet color (i.e., $-\log_{10}(1-.9)=1.0$), a probability function value of 0.999 is indicated by yellow (i.e., $-\log_{10}(1-.999)=3.0$), and so on. As evident from FIG. 11b, gas sand GS is clearly shown, indicating that the AVO values corresponding to these reflections are well outside of the background probability distribution. Also as shown in FIG. 11b, oil sand OS is distinctly shown, indicating that its corresponding AVO indicator values (which are of modest positive magnitude, as evident in FIG. 11a), are well outside of the background probability distribution and thus are statistically significant. As is clearly shown by this example, the preferred embodiment of the invention improves the resolution of AVO surveys by relying both on the AVO indicator value and also upon the statistical significance of the deviation of the AVO coefficients from the background trend.

Alternatively, the raw AVO indicator and probability function class may be displayed in some sort of combined form. For example, the raw AVO indicators could be plotted as traces (i.e., filled in for positive amplitude) as before, but with the application of a color scale indicating the value of the probability function of each point (or for those points above the threshold). Further in the alternative, a color survey could be produced where the hue of each depth point would correspond to the amplitude of the raw AVO indicator and where the intensity of the display at that point would correspond to the probability function value of that point (i.e., a high value of P(A,B) would have high intensity, while a low value of P(A,B) would have low intensity). Other display approaches are also contemplated for use in connection with the present invention.

While the present invention has been described according to its preferred embodiments, it is of course contemplated that modifications of, and alternatives to, these embodiments, such modifications and alternatives obtaining the advantages and benefits of this invention, will be apparent to those of ordinary skill in the art having reference to this specification and its drawings. It is contemplated that such modifications and alternatives are within the scope of this invention as subsequently claimed herein.

I claim:

1. A method of operating a computer to analyze seismic survey signals to distinguish the presence of hydrocarbon-bearing formations in a region of the earth corresponding to the seismic survey signals, wherein the seismic survey signals comprise a plurality of series of time-based signals obtained at a plurality of detectors at the earth responsive to seismic energy imparted to the earth, the signals being gathered into gathers of seismic survey signals, each gather representative of energy reflected from depth points below a corresponding one of a plurality of surface locations at a plurality of angles of incidence, the method comprising the steps of:

retrieving, from a memory, digital data corresponding to a plurality of gathers;

determining, for each depth point represented by each of the gathers, an AVO intercept value and an AVO gradient value;

for each of a plurality of analysis depth points, operating the computer to perform the steps of:

selecting a plurality of surrounding depth points that surround the analysis depth point in space and in time;

deriving a background trend of the AVO intercept values and AVO gradient values for the plurality of surrounding depth points;

determining a raw indicator corresponding to the AVO intercept value and the AVO gradient value for the analysis depth point;

evaluating a probability function for the background trend of the AVO intercept values and AVO gradient values for the plurality of surrounding depth points;

modifying the raw indicator for the analysis depth point using the results of the step of evaluating a probability function to produce a modified indicator; and storing the modified indicator in memory; and displaying the values of the modified indicators for the plurality of analysis depth points on an output device.

2. The method of claim 1, wherein the step of evaluating a probability function comprises:

selecting a probability threshold value to identify a region of AVO intercept and AVO gradient values expected to contain a fraction of the surrounding depth points in the background trend; and determining whether the AVO intercept value and AVO gradient value for the analysis depth point fall within the region.

3. The method of claim 2, wherein the step of modifying the raw indicator comprises:

setting the modified indicator to zero responsive to determining that the AVO intercept value and AVO gradient value for the analysis depth point fall within the region.

4. The method of claim 3, wherein the step of modifying the raw indicator further comprises:

setting the modified indicator to equal the raw indicator responsive to determining that the AVO intercept value and AVO gradient value for the analysis depth point fall outside the region.

5. The method of claim 1, wherein the step of evaluating a probability function comprises:

evaluating the probability function for the analysis depth point using the AVO intercept and AVO gradient values to produce a probability function value.

6. The method of claim 5, wherein the step of modifying the raw indicator for the analysis depth point comprises:

calculating the modified indicator by combining the probability function value and the raw indicator value for the analysis depth point.

7. The method of claim 6, wherein the step of calculating the modified indicator comprises:

multiplying the raw indicator value by the probability function value raised to a selected power.

8. The method of claim 7, wherein the selected power is unity.

9. The method of claim 7, wherein the selected power is greater than unity.

10. A digital computing system for analyzing seismic survey signals to identify the presence of hydrocarbon-bearing formations in a region of the earth corresponding to the seismic survey signals, comprising:

a memory for storing data corresponding to a plurality of gathers of seismic signals, each seismic survey signal obtained from a detector located at the earth responsive to seismic energy imparted to the earth, each gather corresponding to a plurality of seismic signals reflected from depth points below one of a plurality of surface locations at varying angles of incidence;

a graphics output device; and a programmed computer, coupled to the memory and to the graphics output device, for:

retrieving, from the memory, digital data corresponding to a plurality of gathers;

determining, for each depth point represented in each of the gathers, an AVO intercept value and an AVO gradient value;

selecting a plurality of surrounding depth points surrounding an analysis depth point in space and in time;

deriving a background trend of the AVO intercept values and AVO gradient values for the plurality of surrounding depth points;

determining a raw indicator corresponding to the AVO intercept value and the AVO gradient value for the analysis depth point;

evaluating a probability function for the background trend of the AVO intercept values and AVO gradient values for the plurality of surrounding depth points;

modifying the raw indicator for the analysis depth point using the results of the step of evaluating a probability function to produce a modified indicator;

storing the modified indicator in memory for the analysis depth point;

repeating the selecting, deriving, determining, evaluating, modifying, and storing steps for a plurality of analysis depth points; and communicating the values of the modified indicators for the plurality of analysis depth points to the output device.

11. The system of claim 10, wherein the output device comprises a graphics display.

12. The system of claim 10, wherein the output device comprises a printer.

13. The system of claim 10, wherein the computer is programmed to evaluate the probability function for the analysis depth point by:

selecting a probability threshold value to identify a region of AVO intercept and AVO gradient values expected to contain a fraction of the surrounding depth points in the background trend; and determining whether the AVO intercept value and AVO gradient value for the analysis depth point fall within the region.

14. The system of claim 13, wherein the computer is programmed to modify the raw indicator for the analysis depth point by setting the modified indicator to zero responsive to determining that the AVO intercept value and AVO gradient value for the analysis depth point fall within the region, and by setting the modified indicator to equal the raw indicator responsive to determining that the AVO intercept value and AVO gradient value for the analysis depth point fall outside the region.

15. The system of claim 10, wherein the computer is programmed to evaluate the probability function for the analysis depth point by evaluating the probability function for the analysis depth point using the AVO intercept and AVO gradient values to produce a probability function value;

and wherein the computer is programmed to modify the raw indicator for the analysis depth point by calculating the modified indicator by combining the probability function value and the raw indicator value for the analysis depth point.

16. A computer-readable memory having a storage medium configured so that, when read and used by a computer, the computer is directed to distinguish the presence of hydrocarbon-bearing formations in a region of the earth corresponding to the seismic survey signals, wherein the seismic survey signals comprise a plurality of gathers of time-based seismic survey signals obtained at a plurality of detectors at the earth responsive to seismic energy imparted to the earth, each gather representative of energy reflected from depth points below a corresponding one of a plurality of surface locations at a plurality of angles of incidence, said computer directed by a plurality of operations comprising:

retrieving, from a memory, digital data corresponding to a plurality of gathers;

determining, for each depth point represented by each of the gathers, an AVO intercept value and an AVO gradient value;

for each of a plurality of analysis depth points, operating the computer to perform the steps of:

selecting a plurality of surrounding depth points that surround the analysis depth point in space and in time;

deriving a background trend of the AVO intercept values and AVO gradient values for the plurality of surrounding depth points;

determining a raw indicator corresponding to the AVO intercept value and the AVO gradient value for the analysis depth point;

evaluating a probability function for the background trend of the AVO intercept values and AVO gradient values for the plurality of surrounding depth points;

modifying the raw indicator for the analysis depth point using the results of the step of evaluating a probability function to produce a modified indicator; and storing the modified indicator in memory; and displaying the values of the modified indicators for the plurality of analysis depth points on an output device.

17. The computer-readable memory of claim 16, wherein the operation of evaluating the probability function for each analysis depth point comprises:

selecting a probability threshold value to identify a region of AVO intercept and AVO gradient values expected to contain a fraction of the surrounding depth points in the background trend; and determining whether the AVO intercept value and AVO gradient value for the analysis depth point fall within the region.

18. The computer-readable memory of claim 17, wherein the operation of modifying the raw indicator for each analysis depth point comprises:

setting the modified indicator to zero responsive to determining that the AVO intercept value and AVO gradient value for the analysis depth point fall within the region; and setting the modified indicator to equal the raw indicator responsive to determining that the AVO intercept value and AVO gradient value for the analysis depth point fall outside the region.

19. The computer-readable memory of claim 16, wherein the operation of evaluating the probability function for each analysis depth point comprises:

evaluating the probability function for the analysis depth point using the AVO intercept and AVO gradient values to produce a probability function value;

and wherein the operation of modifying the raw indicator for each analysis depth point comprises:

calculating the modified indicator by combining the probability function value and the raw indicator value for the analysis depth point.

* * * * *